United States Patent
Tanabe et al.

(10) Patent No.: US 10,241,601 B2
(45) Date of Patent: Mar. 26, 2019

(54) MOBILE ELECTRONIC DEVICE, CONTROL METHOD, AND NON-TRANSITORY STORAGE MEDIUM THAT STORES CONTROL PROGRAM

(71) Applicant: KYOCERA Corporation, Kyoto-shi, Kyoto (JP)

(72) Inventors: Shigeki Tanabe, Yokohama (JP); Hideki Morita, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 89 days.

(21) Appl. No.: 15/507,231

(22) PCT Filed: Aug. 18, 2015

(86) PCT No.: PCT/JP2015/073136
§ 371 (c)(1),
(2) Date: Feb. 27, 2017

(87) PCT Pub. No.: WO2016/031627
PCT Pub. Date: Mar. 3, 2016

(65) Prior Publication Data
US 2017/0285784 A1 Oct. 5, 2017

(30) Foreign Application Priority Data
Aug. 28, 2014 (JP) .................. 2014-174105

(51) Int. Cl.
*G06F 3/041* (2006.01)
*H04M 1/00* (2006.01)
*G01L 7/12* (2006.01)
*G06F 1/16* (2006.01)

(52) U.S. Cl.
CPC ............. *G06F 3/041* (2013.01); *G01L 7/12* (2013.01); *G06F 1/1684* (2013.01); *H04M 1/00* (2013.01);
(Continued)

(58) Field of Classification Search
CPC ........... G06F 3/041; G06F 2203/04108; G06F 2203/04105; G01L 7/12; H04M 2250/12
See application file for complete search history.

(56) References Cited

U.S. PATENT DOCUMENTS

2005/0219228 A1* 10/2005 Alameh .............. G06F 1/1626
 345/173
2007/0075965 A1 4/2007 Huppi et al.
(Continued)

FOREIGN PATENT DOCUMENTS

JP 10-162033 A 6/1998
JP 2000-295318 A 10/2000
(Continued)

OTHER PUBLICATIONS

Mariko, Nakamura, English translation of JP 2013246605.*
(Continued)

*Primary Examiner* — Nelson M Rosario
*Assistant Examiner* — Andrew Lee
(74) *Attorney, Agent, or Firm* — Hauptman Ham, LLP

(57) ABSTRACT

A mobile electronic device includes a housing, an atmospheric pressure sensor configured to detect atmospheric pressure inside the housing, and at least one controller configured to shift a current first mode to a second mode when it is determined that the housing is gripped by a user of the mobile electronic device based on the detected atmospheric pressure.

4 Claims, 11 Drawing Sheets

(52) U.S. Cl.
CPC .............. *G06F 2203/04105* (2013.01); *G06F 2203/04108* (2013.01); *H04M 2250/12* (2013.01)

(56) References Cited

U.S. PATENT DOCUMENTS

| | | | |
|---|---|---|---|
| 2011/0069024 A1 | 3/2011 | Kim | |
| 2011/0306304 A1 | 12/2011 | Forutanpour et al. | |
| 2012/0206556 A1* | 8/2012 | Yu | H04M 1/00 348/14.02 |
| 2013/0300668 A1* | 11/2013 | Churikov | G06F 3/041 345/168 |
| 2014/0028604 A1* | 1/2014 | Morinaga | G06K 9/00382 345/173 |

FOREIGN PATENT DOCUMENTS

| | | |
|---|---|---|
| JP | 2009-296171 A | 12/2009 |
| JP | 2010-507870 A | 3/2010 |
| JP | 2013-505495 A | 2/2013 |
| JP | 2013-538472 A | 10/2013 |
| JP | 2013-246605 A | 12/2013 |
| JP | 2013246605 A * | 12/2013 |

OTHER PUBLICATIONS

Office Action in JP Application No. 2014-174105, dated Jan. 9, 2018, for which an explanation of relevance is attached. 4pp.

International Search Report in PCT/JP2015/073136, dated Nov. 10, 2015.

* cited by examiner

MOBILE ELECTRONIC DEVICE, CONTROL METHOD, AND NON-TRANSITORY STORAGE MEDIUM THAT STORES CONTROL PROGRAM

CROSS-REFERENCE TO RELATED APPLICATION

This application is a national stage of PCT International Application No. PCT/JP2015/073136 filed Aug. 18, 2015, which claims priority to Japanese Patent Application No. 2014-174105 filed Aug. 28, 2014.

FIELD

The present application relates to a mobile electronic device, a control method, and a non-transitory storage medium that stores a control program.

BACKGROUND

There is a mobile electronic device equipped with an atmospheric pressure sensor, such as a mobile phone and a smartphone. For example, Japanese Patent Application Laid-open No. 10-162033 A discloses a technique of analyzing a situation where a user is placed based on detected atmospheric pressure data and transmitting message information according to a result of the analysis.

SUMMARY

In the above-described mobile electronic device, there is room for improvement in terms of widening applications of the atmospheric pressure data.

According to one aspect, there is provided a mobile electronic device comprising a housing, an atmospheric pressure sensor configured to detect atmospheric pressure inside the housing, and at least one controller configured to shift a current first mode to a second mode when it is determined that the housing is gripped by a user of the mobile electronic device based on the detected atmospheric pressure.

According to one aspect, there is provided a control method of a mobile electronic device with a housing and an atmospheric pressure sensor, the control method comprising: detecting atmospheric pressure inside the housing using the atmospheric pressure sensor; and shifting a current first mode to a second mode when it is determined that the housing is gripped by a user of the mobile electronic device based on the detected atmospheric pressure.

According to one aspect, there is provided a non-transitory storage medium that stores a control program for causing a mobile electronic device with a housing and an atmospheric pressure sensor to execute: detecting atmospheric pressure inside the housing using the atmospheric pressure sensor; and shifting a current first mode to a second mode when it is determined that the housing is gripped by a user of the mobile electronic device based on the detected atmospheric pressure.

DETAILED DESCRIPTION OF THE PREFERRED EMBODIMENTS

A plurality of embodiments for implementation of a mobile electronic device, a control method, and a control program according to the present application will be described in detail with reference to the drawings. Hereinafter, a smartphone will be described as an example of the mobile electronic device.

Figure 1:
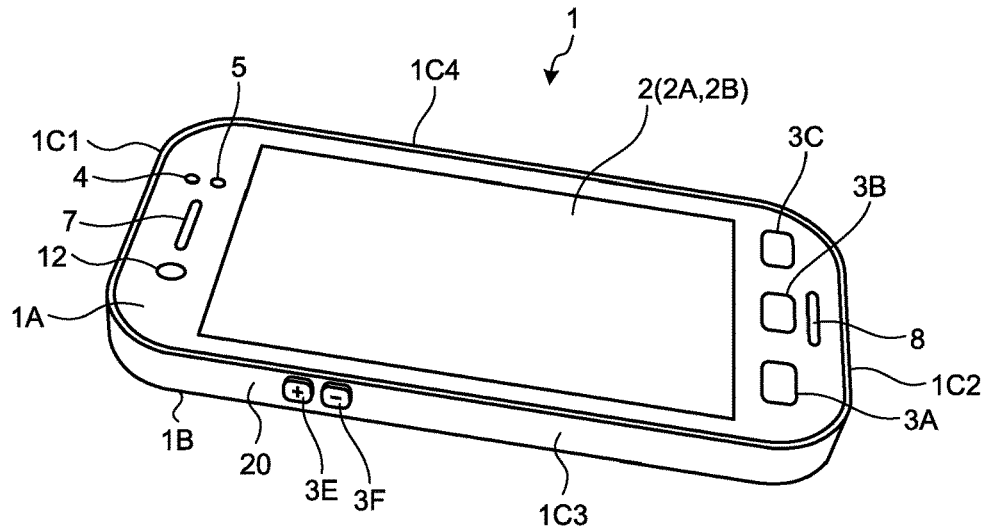
FIG. 1 is a perspective view of a smartphone according to an embodiment.
Figure 2:
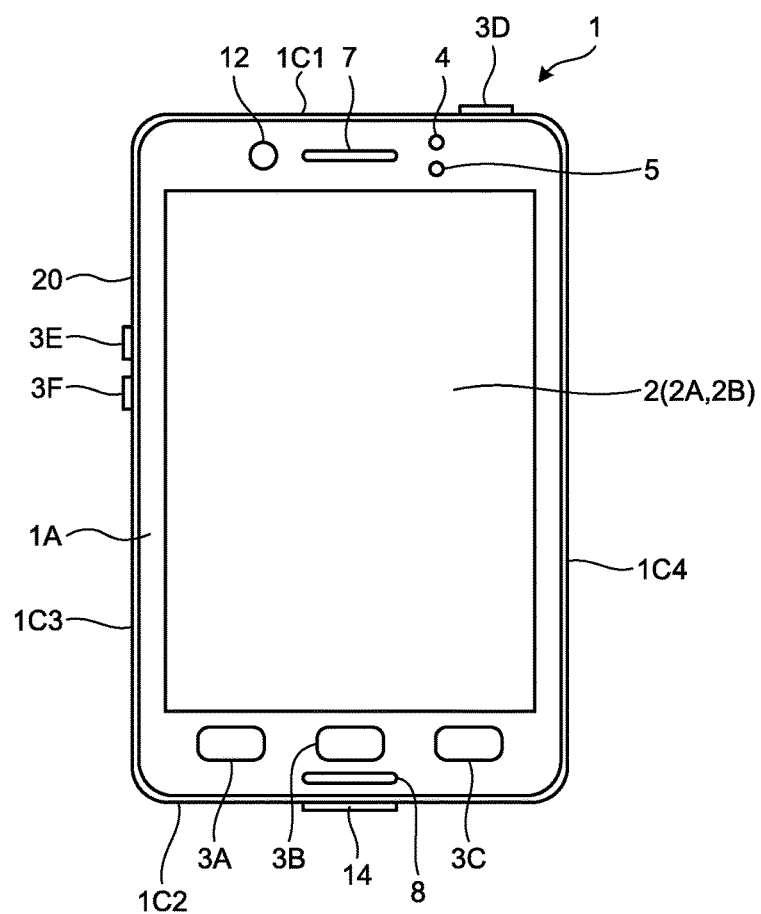
FIG. 2 is a front view of the smartphone.
Figure 3:
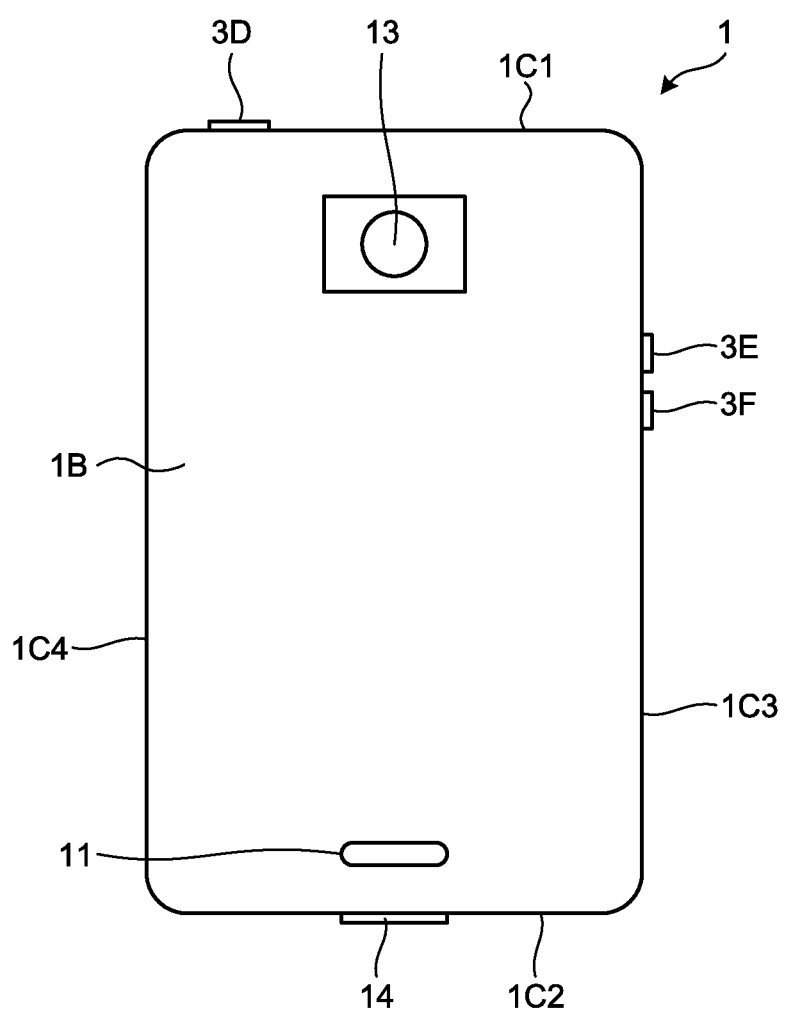
FIG. 3 is a rear view of the smartphone.

The overall configuration of a smartphone 1 as an example of the mobile electronic device will be described with reference to FIGS. 1 to 3. As illustrated in FIGS. 1 to 3, the smartphone 1 includes a housing 20. The housing 20 includes a front face 1A, a rear face 1B, and side faces 1C1 to 1C4. The front face 1A is a front face of the housing 20. The rear face 1B is a rear face of the housing 20. The side faces 1C1 to 1C4 are side faces that connect the front face 1A and the rear face 1B. Hereinafter, the side faces 1C1 to 1C4 will be sometimes collectively referred to as a side face 1C instead of specifying a certain face thereamong.

The smartphone 1 includes a touch screen display 2, buttons 3A to 3C, an illumination sensor 4, a proximity sensor 5, a receiver 7, a microphone 8, and a camera 12 on the front face 1A. The smartphone 1 includes a speaker 11 and a camera 13 on the rear face 1B. The smartphone 1 includes buttons 3D to 3F and a connector 14 on the side face 1C. Hereinafter, the buttons 3A to 3F are sometimes collectively referred to as a button 3 instead of specifying a certain button thereamong.

The touch screen display 2 includes a display 2A and a touch screen 2B. Each of the display 2A and the touch screen 2B has a substantially rectangular shape in the example of FIG. 1, but the shapes of the display 2A and the touch screen 2B are not limited thereto. Each of the display 2A and the touch screen 2B may have any shape such as a square or a circle. Although the display 2A and the touch screen 2B are positioned to superimpose on each other in the example of FIG. 1, the positions of the display 2A and the touch screen 2B are not limited thereto. For example, the display 2A and the touch screen 2B may be positioned side by side or positioned separately. A long side of the display 2A is positioned along a long side of the touch screen 2B, and a short side of the display 2A is disposed along a short side of the touch screen 2B in the example of FIG. 1, but the method of superimposing the display 2A and the touch screen 2B on each other is not limited thereto. When the display 2A and the touch screen 2B are positioned to superimpose on each other, for example, one or more sides of the display 2A are not necessarily positioned along any side of the touch screen 2B.

The display 2A includes a display device such as a liquid crystal display (LCD), an organic EL the display (OELD: Organic Electro-Luminescence Display), or an inorganic EL the display (IELD: Inorganic Electro-Luminescence Display). The display 2A displays a letter, an image, a sign, a figure and the like.

The touch screen 2B detects contact of a finger, a pen, a stylus pen or the like with respect to the touch screen 2B. The touch screen 2B can detect positions at which a plurality of fingers, pens, stylus pens or the like has contacted with the touch screen 2B. In the following description, the finger, the pen, or the stylus pen that contacts with the touch screen 2B will be sometimes referred to as a "contact object" or a "contact article".

A detection type of the touch screen 2B may be any type among an electrostatic capacitance type, a resistive film type, a surface acoustic wave type (or an ultrasonic type), an infrared type, an electromagnetic induction type, and a load detection type. In the following description, it is assumed that a user touches the touch screen 2B using a finger to operate the smartphone 1 in order for simplification of the description.

The smartphone 1 determines a type of a gesture based on at least one of a contact detected by the touch screen 2B, a position where the contact is detected, a change in a position where contact is detected, an interval between detected contacts, and the number of detection times of contact. The gesture is an operation performed by a finger with respect to the touch screen 2B. Examples of the gesture determined by the smartphone 1 include, but are not limited to, touch, long touch, release, swipe, tap, double tap, long tap, drag, flick, pinch-in, pinch-out, etc.

The smartphone 1 operates according to the gesture determined using the touch screen 2B. Thus, the operability that is intuitive and easily available for the user is realized. The operation of the smartphone 1 to be performed according to the determined gesture defers depending on a screen that is displayed on the display 2A in some cases. In the following description, the expression "the touch screen 2B detects contact, and the smartphone 1 determines a kind of a gesture based on the detected contact as X" is described as "the smartphone detects X," or "a controller detects X" in order for simplification of the description.

The housing 20 of the smartphone 1 has a sealing structure. The housing 20 has a space where sealing structure prevents water intrusion into the inside thereof. In the smartphone 1, an opening formed in the housing 20 is occluded by a functional member through which a gas passes and a liquid does not pass, a cap and the like in order to realize the sealing structure. The functional member through which the gas passes and the liquid does not pass is realized using, for example, Gore-Tex (registered trademark) or the like. In some embodiments, the housing 20 includes the touch screen display 2 and the button 3. In this case, the smartphone 1 prevents the water intrusion into a gap between the housing 20 and each of the touch screen display 2 and the button 3 using the functional member through which the gas passes and the liquid does not pass or the like.

Figure 4:
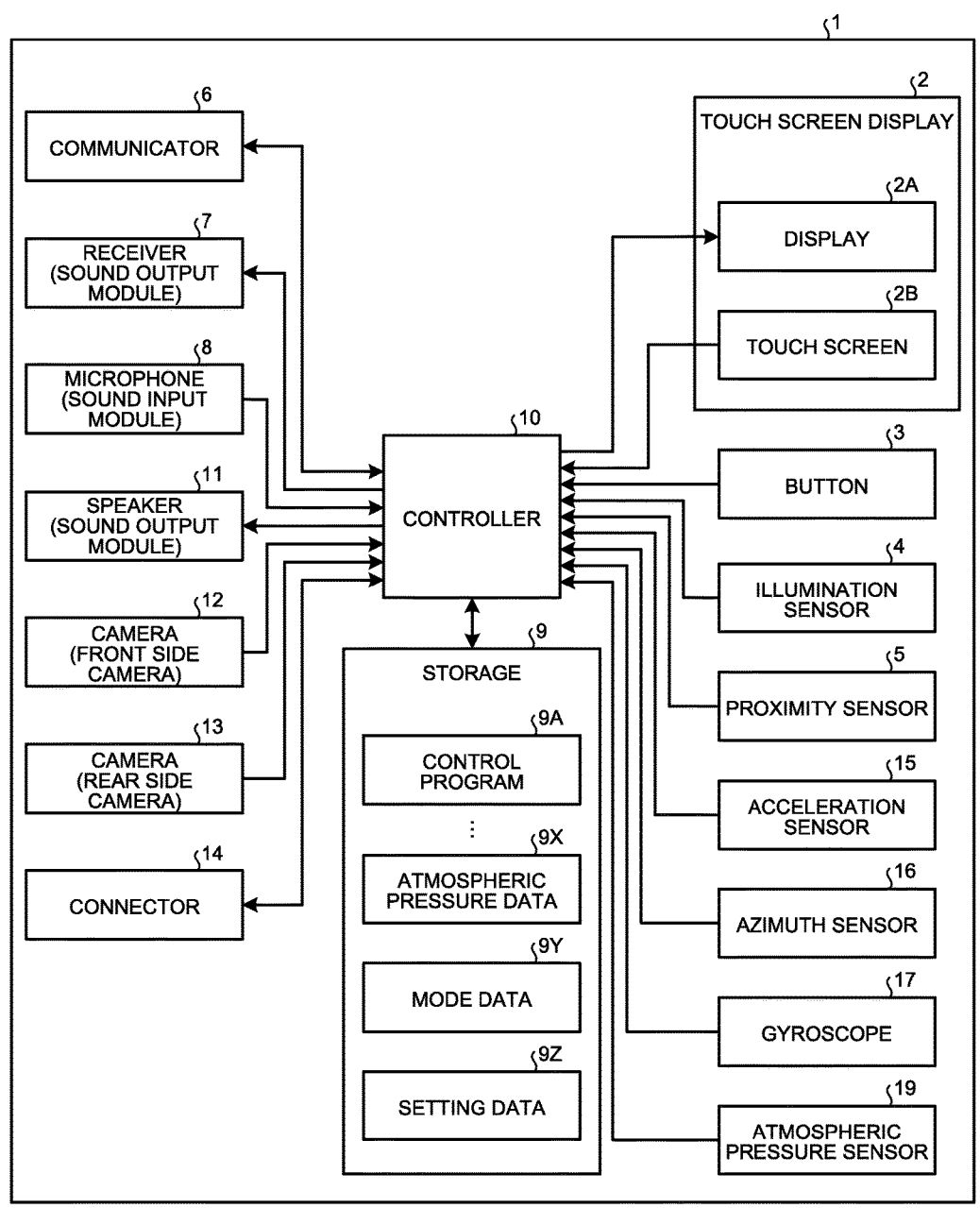
FIG. 4 is a block diagram of the smartphone.

FIG. 4 is a block diagram of the smartphone 1. The smartphone 1 includes the touch screen display 2, the button 3, the illumination sensor 4, the proximity sensor 5, a communicator 6, the receiver 7, the microphone 8, a storage 9, a controller 10, the speaker 11, the cameras 12 and 13, the connector 14, an acceleration sensor 15, a azimuth sensor 16, a gyroscope 17, and an atmospheric pressure sensor 19.

The touch screen display 2 includes the display 2A and the touch screen 2B as described above. The display 2A displays a letter, an image, a sign, a figure and the like. The touch screen 2B detects contact. The controller 10 detects a gesture with respect to the smartphone 1. More specifically, the controller 10 detects an operation (gesture) with respect to the touch screen 2B (touch screen display 2) in cooperation with the touch screen 2B.

The button 3 is operated by the user. The button 3 includes the button 3A to the button 3F. The controller 10 detects an operation with respect to the button 3 in cooperation with the button 3. Examples of the operation with respect to the button 3 include, but are not limited to click, double click, triple click, push, multi-push, etc.

For example, the buttons 3A to 3C are a home button, a back button, or a menu button. For example, the button 3D is a power on/off button of the smartphone 1. The button 3D may function also as a sleep/sleep release button. For example, the buttons 3E and 3F are volume buttons.

The illumination sensor 4 detects illumination of ambient light of the smartphone 1. The illumination is a value of a light flux which is incident on a unit area of a measurement surface of the illumination sensor 4. For example, the illumination sensor 4 is used for adjustment of brightness of the display 2A. The proximity sensor 5 detects presence of an adjacent object in a non-contact manner. The proximity sensor 5 detects the presence of the object based on a change in a magnetic field or a change in returning time of a reflected ultrasonic wave. For example, the proximity sensor 5 detects approaching of a face to the touch screen display 2. The illumination sensor 4 and the proximity sensor 5 may be configured as one sensor. The illumination sensor 4 may be used as a proximity sensor.

The communicator 6 performs communication in a wireless manner. A communication system supported by the communicator 6 is wireless communication standard. Examples of the wireless communication standard include, but are not limited to a communication standard of cellular phones such as 2G, 3G, 4G, etc. Examples of the communication standard of cellular phones include, but are not limited to LTE (Long Term Evolution), W-CDMA (Wideband Code Division Multiple Access), CDMA 2000, PDC (Personal Digital Cellular), GSM (registered trademark) (Global System for Mobile Communications), PHS (Personal Handy-phone System), etc. Examples of the wireless communication standard further include, but are not limited to WiMAX (Worldwide Interoperability for Microwave Access), IEEE 802.11, Bluetooth (registered trademark), IrDA (Infrared Data Association), NFC (Near Field Communication), etc. The communicator 6 may support one or a plurality of the above-described communication standards.

The receiver 7 and the speaker 11 are sound output modules. The receiver 7 and the speaker 11 output a sound signal transmitted from the controller 10 as sound. For example, the receiver 7 is used to output voice of a partner on calling. For example, the speaker 11 is used to output a ring tone and music. One of the receiver 7 and the speaker 11 may also serve the function of the other. The microphone 8 is a sound input module. The microphone 8 converts voice or the like of the user into a sound signal and transmits the converted signal to the controller 10.

The storage 9 stores a program and data therein. The storage 9 is also used as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disk and a magneto-optical disk, and a reading device of the storage medium. The storage 9 may include a storage device that is used as a temporary storage area such as a RAM (Random Access Memory).

The program stored in the storage 9 includes an application that is executed in the foreground or background and a control program that supports the operation of the application. For example, the application causes a screen to be displayed on the display 2A and causes the controller 10 to execute the processing according to the gesture detected using the touch screen 2B. The control program is, for example, an OS. The application and the control program may be installed in the storage 9 via the wireless communication performed by the communicator 6 or the non-transitory storage medium.

For example, the storage 9 stores a control program 9A, atmospheric pressure data 9X, mode data 9Y, and setting data 9Z. The atmospheric pressure data 9X includes information indicating atmospheric pressure that acts on the smartphone 1. The mode data 9Y includes information indicating a mode of the smartphone 1. The setting data 9Z includes information relating to various kinds of setting which relates to the operation of the smartphone 1.

The control program 9A can provide functions relating to various kinds of control for activation of the smartphone 1. The control program 9A realizes a call by controlling, for example, the communicator 6, the receiver 7, the microphone 8, and the like. The functions provided by the control program 9A include a function of performing various kinds of control such as a change of information displayed on the display 2A according to the gesture detected using the touch screen 2B. The functions provided by the control program 9A include a function of performing various kinds of control according to the atmospheric pressure inside the housing 20 by controlling the atmospheric pressure sensor 19. The functions provided by the control program 9A may be used in combination with a function provided by another program.

The control program 9A can provide a function to determine whether the housing 20 is gripped by a user or the like based on a value of atmospheric pressure detected by the atmospheric pressure sensor 19. The grip of the housing 20 includes a case where the user grabs the housing 20, a case where the user grasps the housing 20, and a case where the user strongly grasps the housing 20 after just holding the housing 20. The grip of the housing 20 is an operation that is different from the above-described gesture with respect to the touch screen display 2. The method of determining the grip will be described later. The grip of the housing 20 includes a case where the user's hand, finger or the like grips a part of the housing 20 other than the touch screen display 2 and a case where the hand, the finger or the like touches the housing 20 and the touch screen display 2. The control program 9A may provide a function to perform a call via communication performed by the communicator 6.

The control program 9A may provide a function to determine whether the user holds the housing 20 in the hand based on a detection result of the acceleration sensor 15. For example, the smartphone 1 may acquire a pattern of a frequency, amplitude and the like for vibration in a state where the smartphone 1 is held by the user's hand, using the acceleration sensor 15. The smartphone 1 may determine whether the user holds the housing 20 in the hand by comparing an acquired result and a first acceleration pattern prepared in advance. The first acceleration pattern may be an acceleration pattern that is characteristically detected by the acceleration sensor 15 in a state where the user holds the smartphone 1 in the hand. For example, the acceleration pattern may be prepared by acquiring a detection value of the acceleration sensor 15 in a state where an examiner actually holds the smartphone 1 in the hand in advance. One or a plurality of the first acceleration patterns may be prepared. The first acceleration pattern may be an acceleration pattern that is acquired based on a detection value of the acceleration sensor 15 when the examiner actually lifts the smartphone 1 by hand.

The control program 9A may provide a function to determine a state where the smartphone 1 is placed on a desk and the like or housed in a bag and the like (hereinafter, referred to as a stationary state) based on a detection result of the acceleration sensor 15.

The smartphone 1 can acquire a pattern of a frequency, amplitude and the like for vibration in the stationary state using the acceleration sensor 15. The smartphone 1 can determine the stationary state by comparing an acquired result and a second acceleration pattern prepared in advance. The second acceleration pattern may be prepared, for example, by acquiring a detection value of the acceleration sensor 15 in the stationary state of the smartphone 1 in advance.

The first acceleration pattern and the second acceleration pattern may be stored in the storage 9 and the like.

A plurality of the atmospheric pressure information are stored in the atmospheric pressure data 9X in a time-series manner. The atmospheric pressure information includes items such as time and a value of atmospheric pressure. The time indicates time at which the atmospheric pressure is detected by the atmospheric pressure sensor 19. The atmospheric pressure value indicates an atmospheric pressure value that is detected by the atmospheric pressure sensor 19.

The smartphone 1 includes a plurality of modes. For example, the plurality of modes includes a standby mode, a notification mode, a call mode, an answering machine mode, a public mode, a video call mode, and the like. The standby mode is a standby mode of the smartphone 1. The notification mode is a mode where the smartphone 1 notifies acceptance of an incoming call, acceptance of an e-mail, and the like. The notification mode includes a plurality of setting modes corresponding to setting of the user. For example, the setting mode includes a manner mode, a silent mode, a zero-volume mode, and the like. The manner mode is a mode where a notification sound and a ring tone are not output and the housing 20 is vibrated by a vibrator. The silent mode is a mode where only display on the touch screen display 2 is performed, the notification sound and the ring tone are not output, and vibration is not generated. The zero-volume mode is a mode where the notification is performed by setting an output value of the voice to zero.

The call mode is a mode which allows a call with an electronic device on the partner side. The answering machine mode is a mode where an incoming call is not notified but forwarded to a telephone answering machine center or the like. The public mode is a mode of answering using guidance or the like to inform a caller of incapability of accepting the incoming call during driving and/or in a public place where the use of the phone is desirably refrained. The video call mode is a mode where a video call is possible with the electronic device on the partner side. The smartphone 1 may include a mode other than the above-described mode.

The mode data 9Y can store mode information that indicates a shifted mode. Further, the smartphone 1 can execute a mode process corresponding to the mode information. For example, when the notification mode is stored in the mode data 9Y, the smartphone 1 may execute a process of notifying the acceptance of the incoming call, the acceptance of the e-mail, and the like.

The setting data 9Z includes determination condition data to perform determination regarding the grip of the housing 20 of the smartphone 1. The determination condition data includes a condition to determine whether the housing 20 is gripped by the user based on the atmospheric pressure value detected by the atmospheric pressure sensor 19 of the smartphone 1 through execution of the control program 9A. Examples of the determination condition data include, but are not limited to, a change pattern of atmospheric pressure caused inside the housing 20 when the user grips the housing 20, a range of a change amount of atmospheric pressure per predetermined time, etc.

The controller 10 is an arithmetic processing unit. Examples of the arithmetic processing unit include, but are not limited to, a CPU (Central Processing Unit), an SoC (System-on-a-chip), an MCU (Micro Control Unit), an FPGA (Field-Programmable Gate Array), a coprocessor, etc. The controller 10 can integrally control the operation of the smartphone 1. Various functions of the controller 10 are realized based on the control of the controller 10.

More specifically, the controller 10 can execute commands included in the program stored in the storage 9. The controller 10 can refer the data stored in the storage 9 if necessary. The controller 10 controls functional modules according to the data and the commands. The controller 10 realizes various functions by controlling the functional modules. Examples of the functional modules include, but are not limited to, the display 2A, the communicator 6, the receiver 7, the speaker 11, etc. The controller 10 sometimes changes the control depending on a detection result of a detection module. Examples of the detection module include, but are not limited to, the touch screen 2B, the button 3, the illumination sensor 4, the proximity sensor 5, the microphone 8, the camera 12, the camera 13, the acceleration sensor 15, the azimuth sensor 16, the gyroscope 17, the atmospheric pressure sensor 19, etc.

For example, the controller 10 can execute various kinds of control such as change of information displayed on the display 2A according to the gesture detected using the touch screen 2B by executing the control program 9A.

The camera 12 is a front side camera that images an object facing the front face 1A. The camera 13 is a rear side camera that images an object facing the rear face 1B.

The connector 14 is a terminal to which other device is connected. The connector 14 may be a general-purpose terminal such as a USB (Universal Serial Bus), an HDMI (registered trademark) (High-Definition Multimedia Interface), a light peak (Thunderbolt (registered trademark)), and an earphone/microphone connector. The connector 14 may be a dedicated terminal such as a dock connector. Examples of the device connected to the connector 14 include, but are not limited to, an external storage, a speaker, a communication device, etc.

The acceleration sensor 15 can detect a direction and a magnitude of acceleration applied to the smartphone 1. The azimuth sensor 16 can detect the orientation of geomagnetism. The gyroscope 17 can detect an angle and angular velocity of the smartphone 1. The atmospheric pressure sensor 19 can detect atmospheric pressure acting on the smartphone 1. Each detection result of the acceleration sensor 15, the azimuth sensor 16, the gyroscope 17, and the atmospheric pressure sensor 19 is used in combination with each other in order to detect change in a position and an attitude of the smartphone 1.

A partial or the entire program and data stored in the storage 9 in FIG. 4 may be downloaded from another device through the wireless communication using the communicator 6. A partial or the entire program and data stored in the storage 9 in FIG. 4 may be stored in a non-transitory storage medium that can be read by a reading device included in the storage 9. A partial or the entire program and data stored in the storage 9 in FIG. 4 may be stored in a non-transitory storage medium that can be read by a reading device to be connected to the connector 14. Examples of the non-transitory storage medium include, but are not limited to, an optical disk such as a CD (registered trademark), a DVD (registered trademark), and Blu-ray (registered trademark), a magneto-optical disk, a magnetic storage medium, a memory card, a solid-state storage medium, etc.

The configuration of the smartphone 1 illustrated in FIG. 4 is an example, and may be appropriately changed in a range that does not impair a gist of the present application. For example, the number of the buttons 3 and the kinds thereof are not limited to those in the example of FIG. 4. The smartphone 1 may include buttons such as a numeric keypad array and a QWERTY array instead of the buttons 3A to 3C as buttons for the operation relating to the screen. The smartphone 1 may include only one button for the operation relating to the screen or does not necessarily include any button. Although the smartphone 1 includes the two cameras in the example illustrated in FIG. 4, the smartphone 1 may include only one camera or does not necessarily include any camera. Although the smartphone 1 includes the four kinds of sensors to detect the position and the attitude in the example illustrated in FIG. 4, the smartphone 1 does not necessarily include some of the sensors. Alternatively, the smartphone 1 may include another kind of sensor to detect at least one of the position and the attitude.

The smartphone 1 has an opened state and a sealed state. In the opened state, the sealing of the housing 20 is incomplete. The opened state is a state where the atmospheric pressure inside the housing 20 and the outside atmospheric pressure become the same. Examples of the opened state include a state where the opening of the housing 20 is not occluded by the cap. When the smartphone 1 is in the opened state, a change in atmospheric pressure inside the housing 20 is small even when being operated or gripped by the user.

The sealed state is a state where the water intrusion into the housing 20 is prevented. Examples of the sealed state include a state where the opening of the housing 20 is occluded by the cap. In the sealed state, a gas hardly comes out of the opening of the housing 20 as compared to the opened state. Thus, a phenomenon that the atmospheric pressure inside the housing 20 becomes temporarily higher than that in a case where the opening is opened occurs in the sealed state.

When the smartphone 1 is gripped by the user's hand, finger or the like in the sealed state, distortion occurs in the housing 20 so that the volume inside the housing 20 decreases, and the atmospheric pressure inside the housing 20 increases. Further, the volume inside the housing 20 returns to the state before the smartphone 1 is gripped, and the atmospheric pressure inside the housing 20 drops at once as the counteraction thereof when the user loosens a gripping force of the hand, the finger or the like or when the user takes away the hand, the finger or the like from the housing 20. The smartphone 1 can determine the grip state of the housing 20 based on the atmospheric pressure change inside the housing 20 detected by the atmospheric pressure sensor 19.

Although the following description is given assuming the sealed state of the smartphone 1, but embodiments are not limited thereto. For example, when the atmospheric pressure change is caused inside the housing 20 even in the opened state, the smartphone 1 may determine the grip state of the housing 20 based on a determination condition of the opened state and the atmospheric pressure change inside the housing 20.

Figure 5:
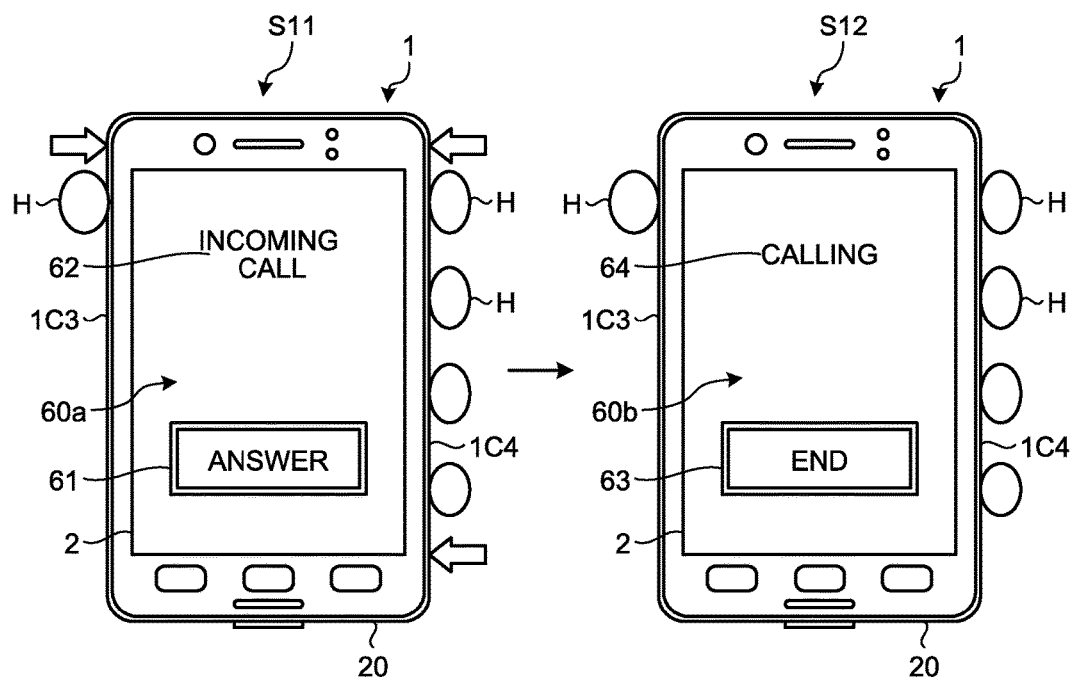
FIG. 5 is a diagram illustrating an example of control relating to acceptance of an incoming call according to the smartphone.

FIG. 5 is a diagram illustrating an example of control relating to acceptance of an incoming call according to the smartphone 1. In the following description, the same components will be denoted by the same reference signs, and the redundant description thereof will be sometimes omitted.

The smartphone 1 is shifted to the notification mode of notifying an incoming call from an electronic device at Step S11 when detecting a signal of the incoming call from the electronic device on the partner side using the communicator 6. For example, when detecting the incoming call signal in a standby mode where the smartphone 1 is in a standby state, the smartphone 1 is shifted from the standby mode to the notification mode. Further, the smartphone 1 shifted to the notification mode displays an incoming call screen 60*a*, which indicates reception of the incoming call, on the touch screen display 2 (the display 2A). The smartphone 1 may notify the user of the incoming call using a ring tone, vibration, flashing of a lamp, and the like in addition to the display of the incoming call screen 60*a*.

The incoming call screen 60*a* includes a button 61 and a display area 62 in the example illustrated in FIG. 5. The button 61 is a button to answer to the incoming call. A message, which indicates the reception of the incoming call, is displayed in the display area 62. In general, the user grips the side faces 1C3 and 1C4 of the housing 20 and uses the smartphone 1, which is in a vertically long state, when performing a call using the smartphone 1. Thus, the smartphone 1 can detect the atmospheric pressure change caused inside the housing 20 when the side faces 1C3 and 1C4 of the housing 20 are gripped by the user.

In Step S11, the user who has noticed the incoming call strongly grips the housing 20 of the smartphone 1 using the user's hand H or the like, instead of performing a general off-hook operation by selecting the button 61, in order to answer to the incoming call. In the example illustrated in FIG. 5, the user strongly grips the smartphone 1 in directions in which the side face 1C3 and the side face 1C4 on the right and left sides thereof approach each other. As a result, the atmospheric pressure inside the housing 20 of the smartphone 1 increases depending on the amount of distortion caused in the housing 20. Further, the smartphone 1 can determine that the housing 20 is gripped by the user when detecting the increase of the atmospheric pressure inside the housing 20, which satisfies the determination condition, based on the atmospheric pressure data 9X detected by the atmospheric pressure sensor 19 in the notification mode.

The atmospheric pressure change inside the housing 20 of the smartphone 1 is caused not only by the grip of the housing 20 performed by the user but also by a press operation with respect to the touch screen display 2, by a change in atmospheric pressure, by a change in altitude, and the like. Thus, the smartphone 1 needs to distinguish the atmospheric pressure change caused by the grip of the housing 20 from changes of atmospheric pressure caused by other factors. The atmospheric pressure change caused in the housing 20 when the housing 20 is gripped by the user is larger than that caused by the press operation with respect to the touch screen display 2, and the change occurs in a shorter period of time than the case of being caused by the changes in atmospheric pressure and altitude. In some embodiments, the smartphone 1 can store the determination condition data, which indicates the determination condition to determine whether the atmospheric pressure change inside the housing 20 is caused by the grip of the housing 20 or by the other factors, in the setting data 9Z. For example, the determination condition data includes the change amount of atmospheric pressure per predetermined time, the change pattern, and the like.

When it is determined that the housing 20 is gripped by the user, the smartphone 1 is shifted from the current notification mode to the call mode and displays a call screen 60*b*, which indicates a state in calling, on the touch screen display 2 (the display 2A) at Step S12. In the example illustrated in FIG. 5, the call screen 60*b* includes a button 63 and a display area 64. The button 63 is a button to disconnect the call. A message, which indicates the state in calling, is displayed in the display area 64. Further, the user performs the call by bringing the smartphone 1 close to the ear.

In this manner, the smartphone 1 can make the user's grip operation with respect to the housing 20 effective by widening applications of the atmospheric pressure data 9X indicating the atmospheric pressure inside the housing 20, and it is possible to improve the operability of the smartphone 1. For example, the user sometimes puts on gloves or can use only one hand when notified of the incoming call by the smartphone 1. In this case, the user can answer to the incoming call by gripping the housing 20 without operating the touch screen display 2. Furthermore, the mode of the smartphone 1 can be shifted by the grip of the housing 20 even if the user does not operate the touch screen display 2.

Figure 6:
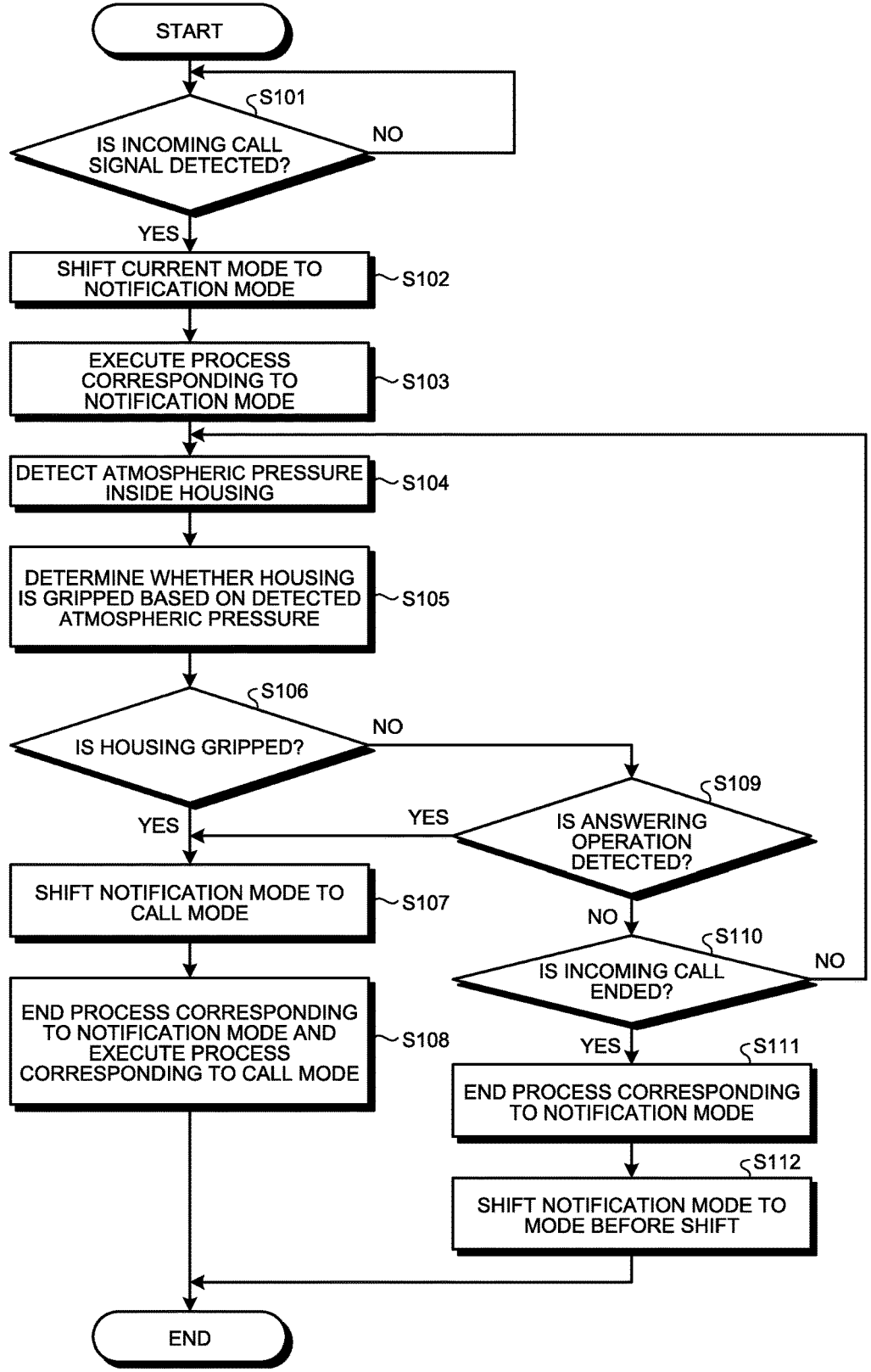
FIG. 6 is a flowchart illustrating an exemplary processing procedure of the control according to the smartphone.

FIG. 6 is a flowchart illustrating an exemplary processing procedure of control according to the smartphone 1. The processing procedure illustrated in FIG. 6 is realized when the controller 10 executes the control program 9A. The processing procedure illustrated in FIG. 6 is executed when the function of the grip operation with respect to the housing 20 is effective.

As illustrated in FIG. 6, the controller 10 of the smartphone 1 determines whether the incoming call signal is detected using the communicator 6 at Step S101. When the incoming call signal is not detected (No at Step S101), the controller 10 repeats the process at Step S101.

When the incoming call signal is detected (Yes at Step S101), the controller 10 proceeds to Step S102. The controller 10 shifts the current mode to the notification mode at Step S102. More specifically, when the current mode is the standby mode, the controller 10 stores information indicating the standby mode, which has been stored in the mode data 9Y, as a mode before the shift, and stores information indicating the notification mode as a mode after the shift.

The controller 10 executes a process corresponding to the notification mode at Step S103. More specifically, the controller 10 displays the above-described incoming call screen 60*a* on the touch screen display 2 (the display 2A), and performs the control to notify the user of the incoming call using the ring tone, the vibration, the flashing of the lamp, and the like.

The controller 10 causes the atmospheric pressure sensor 19 to detect the atmospheric pressure inside the housing 20 and stores the detection result in the atmospheric pressure data 9X at Step S104. Further, the controller 10 determines whether the housing 20 is gripped based on the detected atmospheric pressure at Step S105. More specifically, the controller 10 obtains a change amount of atmospheric pressure per predetermined time based on the atmospheric pressure data 9X and determines that the housing 20 is gripped when the change amount of atmospheric pressure satisfies a determination condition indicated by a determination condition data of the setting data 9Z.

When the housing 20 is gripped (Yes at Step S106), the controller 10 proceeds to Step S107. The controller 10 shifts the notification mode to a call mode at Step S107. More specifically, the controller 10 stores information indicating the call mode to be shifted in the mode data 9Y.

The controller 10 ends the process corresponding to the notification mode and executes a process corresponding to the call mode at Step S108. More specifically, the controller 10 executes a process to perform the call with the partner on the line using the communicator 6, a process to display the above-described call screen 60b on the touch screen display 2, and the like. Thereafter, the controller 10 ends the processing procedure illustrated in FIG. 6.

When the housing 20 is not gripped (No at Step S106), the controller 10 proceeds to Step S109. The controller 10 determines whether an answering operation is detected using the touch screen display 2 at Step S109. More specifically, the controller 10 determines that the answering operation is detected when the gesture with respect to the button 61 of the incoming call screen 60a illustrated in FIG. 5 is detected.

When the answering operation is detected (Yes at Step S109), the controller 10 proceeds to Step S107 which has been already described. The controller 10 ends the processing procedure illustrated in FIG. 6 when the processes at Steps S107 and S108 are ended.

When the answering operation is not detected (No at Step S109), the controller 10 proceeds to Step S110. The controller 10 determines whether the incoming call is ended using the communicator 6 at Step S110. When the incoming call from the electronic device on the partner side disappears, the controller 10 determines that the incoming call is ended.

When the incoming call is not ended, that is, when receiving the incoming call (No at Step S110), the controller 10 proceeds to Step S104, which has been already described, to continue the detection of the atmospheric pressure inside the housing 20 and the detection of the answering operation, and the like.

When the incoming call is ended (Yes at Step S110), the controller 10 proceeds to Step S111. The controller 10 ends the process corresponding to the notification mode at Step S111. Further, the controller 10 shifts the notification mode to the mode before the shift as Step S112. Thereafter, the controller 10 ends the processing procedure illustrated in FIG. 6.

Although the description has been given regarding the case where the process of shifting the mode is provided as the processing procedure illustrated in FIG. 6, the smartphone 1 is not limited thereto. For example, the processing procedure illustrated in FIG. 6 may not include the processes of Steps S102, S107 and S112 where the mode of the smartphone 1 is shifted.

The smartphone 1 can reduce power consumption by executing the control to operate the atmospheric pressure sensor 19 only in a specific timing to detect the atmospheric pressure inside the housing 20.

Figure 7A:
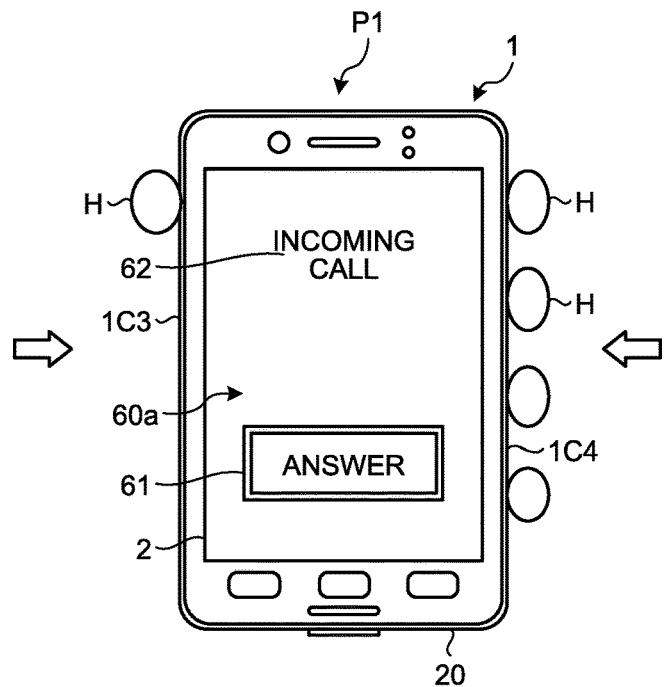
FIG. 7A is a diagram illustrating an example of a grip pattern of the smartphone.
Figure 7B:
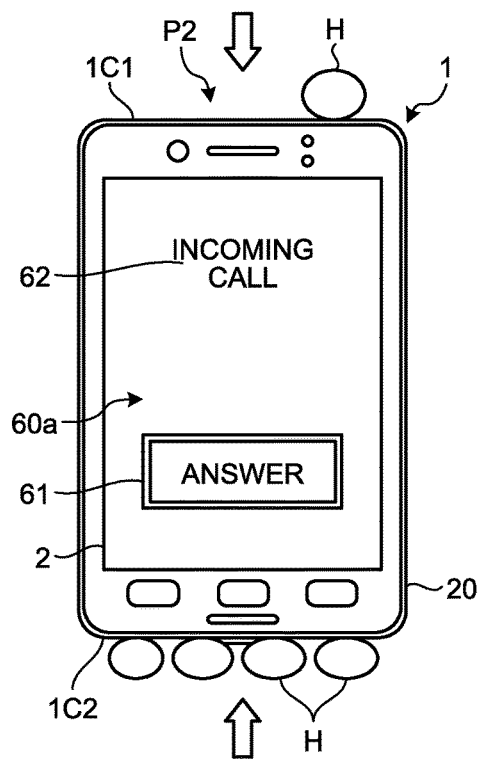
FIG. 7B is a diagram illustrating an example of the grip pattern of the smartphone.

FIGS. 7A and 7B are diagrams illustrating examples of a grip pattern of the smartphone 1. The distortion amount of the housing 20 in the smartphone 1 differs depending on the grip pattern. For example, the smartphone 1 has a grip pattern P1 illustrated in FIG. 7A and a grip pattern P2 illustrated in FIG. 7B.

The grip pattern P1 is a grip pattern that is mainly used at the time of the call. The grip pattern P1 is a pattern where the side face 1C3 and the side face 1C4 of the smartphone 1 are gripped. The grip pattern P2 is a grip pattern that is used for play of a video other than the time of the call. The grip pattern P2 is a pattern where the side face 1C1 and the side face 1C2 of the smartphone 1 are gripped.

In the grip pattern P1, the user more easily grips the smartphone 1 as compared to the grip pattern P2, and the user easily applies a force to the housing 20. Since the user grips the smartphone 1, which is in the vertically long state, in the grip pattern P1, the distortion amount of the housing 20 is larger than that in the horizontally long grip pattern P2. In some embodiments, the smartphone 1 may specify the grip pattern P1 or P2 with respect to the housing 20 based on a range of a change amount of atmospheric pressure for each grip pattern on the basis of experiment, simulation, or the like and shift the current mode to a mode corresponding to the specified grip pattern.

For example, the smartphone 1 in the notification mode determines the grip pattern P1 when the change amount of the atmospheric pressure per predetermined time is within a first range, and shifts the notification mode to the call mode. In this case, the smartphone 1 ends the notification of the incoming call and displays the above-described call screen 60b on the touch screen display 2. The smartphone 1 in the notification mode determines the grip pattern P2 when the change amount of the atmospheric pressure per predetermined time is within a second range, which is different from the first range, and shifts the notification mode to an answering machine mode. In this case, the smartphone 1 can end the notification of the incoming call and forward the incoming call to an answering machine center or the like using the communicator 6.

In this manner, the smartphone 1 selects a mode to be shifted from a plurality of modes that can be shifted from the current mode based on the grip pattern of the housing 20. Thus, the user can select a mode desired to be shifted based on the grip pattern of the housing 20. When the smartphone 1 displays the modes that can be shifted from the current mode on the touch screen display 2, the user can confirm the modes that can be shifted.

Although the description has been given regarding the case where a mode that can be shifted from the notification mode are the call mode and the answering machine mode, the smartphone 1 is not limited thereto. For example, when three or more grip patterns can be specified, the smartphone 1 may be configured such that it is possible to select a mode to be shifted from three or more modes.

Figure 8:
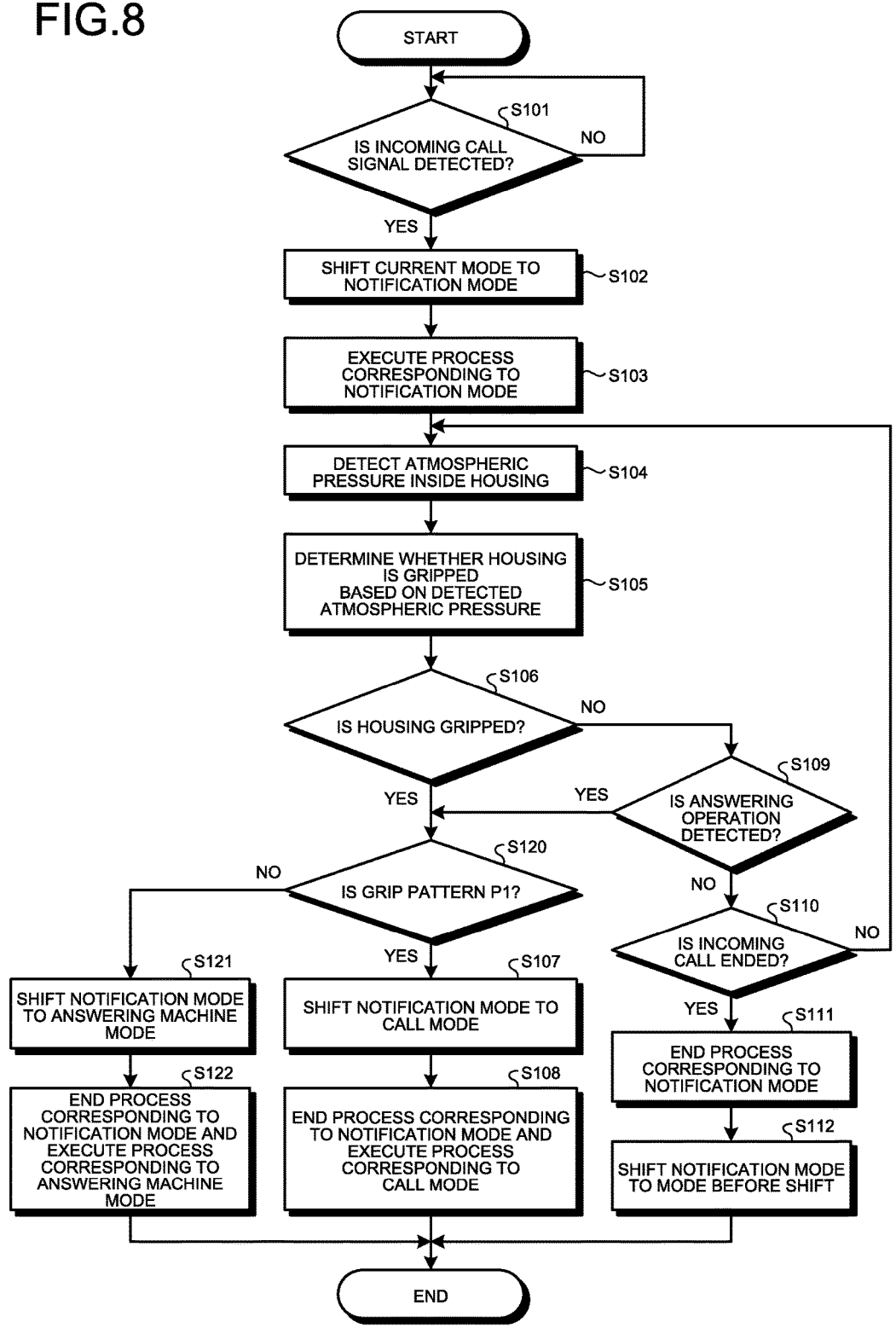
FIG. 8 is a flowchart illustrating an exemplary processing procedure of the control according to the smartphone.

FIG. 8 is a flowchart illustrating an exemplary processing procedure of the control according to the smartphone 1. The processing procedure illustrated in FIG. 8 is realized when the controller 10 executes the control program 9A. The processing procedure illustrated in FIG. 8 is executed when the function of the grip operation with respect to the housing 20 is effective.

In the example illustrated in FIG. 8, processes from Steps S101 to S112 are the same as the processes from Steps S101 to S112 illustrated in FIG. 6, and thus, only different parts will be described, and the same parts will be omitted.

When the housing 20 is gripped (Yes at Step S106), the controller 10 proceeds to Step S120 as illustrated in FIG. 8. The controller 10 determines whether a grip pattern is the grip pattern P1 at Step S120. More specifically, the controller 10 determines that the grip pattern is the grip pattern P1 when the change amount of atmospheric pressure per predetermined time obtained at Step S105 described above is within the above-described first range.

When the grip pattern is the grip pattern P1 (Yes at Step S120), the controller 10 performs the processes of Steps S107 and S108 which have been already described. That is, the controller 10 performs the process corresponding to the call mode. Thereafter, the controller 10 ends the processing procedure illustrated in FIG. 8.

When the grip pattern is not the grip pattern P1, that is, the grip pattern is the grip pattern P2 (No at Step S120), the controller 10 proceeds to Step S121. The controller 10 shifts the notification mode to the answering machine mode at Step S121. More specifically, the controller 10 stores information indicating the answering machine mode as a mode after the shift in the mode data 9Y.

The controller 10 ends the process corresponding to the notification mode and executes a process corresponding to the answering machine mode at Step S122. More specifically, the controller 10 notifies the electronic device on the partner side of a fact that it is difficult to accept the incoming call using the answering machine center or the like by forwarding the incoming call to the answering machine center or the like by the communicator 6. Thereafter, the controller 10 ends the processing procedure illustrated in FIG. 8.

Although the description has been given in the above-described embodiments regarding the case where the grip patterns P1 and P2 are determined based on the atmospheric pressure inside the housing 20, the smartphone 1 is not limited thereto. For example, the smartphone 1 may be configured such that the grip pattern is detected based on the change amount of atmospheric pressure detected by the atmospheric pressure sensor 19 and attitude of the smartphone 1 detected by the gyroscope 17 in combination. For example, when a difference in change amount of the atmospheric pressure between in the vertically long state and in the horizontally long state of the smartphone 1 is small, or the same, the smartphone 1 can determine the grip pattern by considering the attitude thereof.

Figure 9:
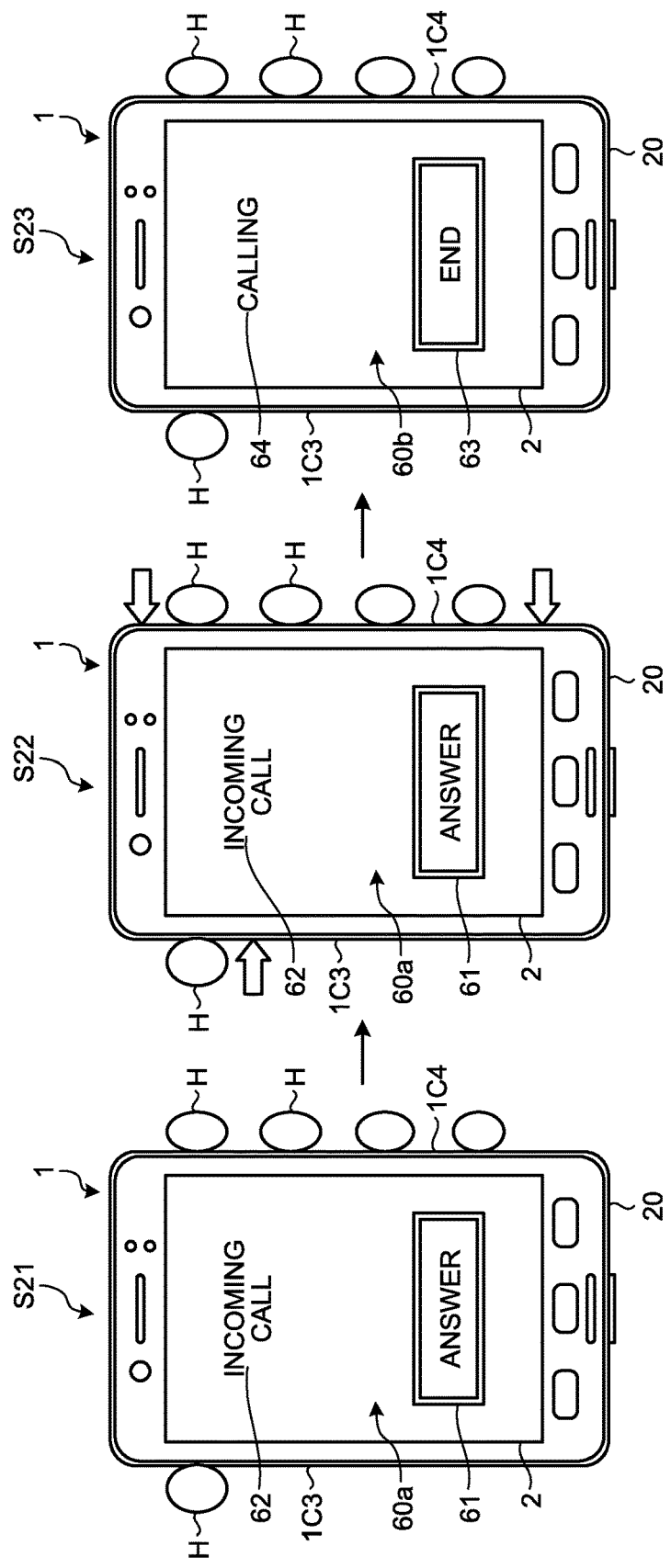
FIG. 9 is a diagram illustrating an example of control relating to acceptance of an incoming call according to the smartphone.

FIG. 9 is a diagram illustrating an example of control relating to acceptance of the incoming call according to the smartphone 1.

The smartphone 1 is shifted to the notification mode of notifying the incoming call from the electronic device at Step S21 when detecting the incoming call signal from the electronic device on the partner side using the communicator 6, and displays the above-described incoming call screen 60a on the touch screen display 2 (the display 2A). The smartphone 1 may notify the user of the incoming call using a ring tone, vibration, flashing of a lamp, and the like in addition to the display of the incoming call screen 60a. Further, the smartphone 1 can determine whether the user holds the smartphone 1 in the hand H based on the detection result of the acceleration sensor 15.

In Step S21, the user who has noticed the incoming call holds the smartphone 1 in the hand H. In the example illustrated in FIG. 9, the user grips the side faces 1C3 and 1C4 of the housing 20. As a result, the smartphone 1 can detect the atmospheric pressure inside the housing 20 using the atmospheric pressure sensor 19 when it is determined that the user holds the smartphone 1 in the hand H.

In Step S22, the user strongly grips the housing 20 of the smartphone 1 in the hand H, which has held the smartphone 1, instead of performing the general off-hook operation by selecting the button 61, in order to answer to the incoming call. As a result, the atmospheric pressure inside the housing 20 of the smartphone 1 increases due to the distortion of the housing 20. Further, the smartphone 1 can determine that the housing 20 is gripped by the user when detecting the increase of the atmospheric pressure inside the housing 20 using the atmospheric pressure sensor 19 in the notification mode.

When it is determined that the housing 20 is gripped by the user, the smartphone 1 can be shifted from the notification mode to the call mode and display the above-described call screen 60b on the touch screen display 2 (the display 2A) at Step S23. Further, the user performs the call using the smartphone 1.

In this manner, the smartphone 1 may determine whether being gripped or not after determining that the user holds the smartphone 1 in the hand H in the notification mode. For example, when the smartphone 1 is put in the user's pocket, bag or the like, there may be a possibility that the weight is added to the housing 20 to cause a change in atmospheric pressure. Even in this case, the smartphone 1 easily specify whether a factor that causes the atmospheric pressure change is due to a grip state or not when it is configured such that the atmospheric pressure inside the housing 20 is detected when it is determined that the user holds the smartphone 1 in the hand H.

Although the description has been given regarding the case where whether the user holds the smartphone 1 in the hand H is determined based on the detection result of the acceleration sensor 15, the smartphone 1 is not limited thereto. For example, the smartphone 1 may determine whether the user holds the smartphone 1 in the hand H based on a result of determination on whether the smartphone is in a contact state with the outside air using the proximity sensor, an UV sensor or the like, and the detection result of the acceleration sensor 15. The smartphone 1 may acquire a rotation pattern of the smartphone using the gyroscope 17 to be used as an aid to increase the accuracy in determination whether the user holds the smartphone 1 in the hand H by comparing the acquisition result and a rotation pattern in a state where the user holds the smartphone 1 in the hand which has been prepared in advance. For example, the rotation pattern may be prepared by acquiring a detection value of the gyroscope sensor 17 in the state where an examiner actually holds the smartphone 1 in the hand H, in advance. One or a plurality of the rotation patterns is prepared. The rotation pattern is stored in the storage 9 or the like.

Figure 10:
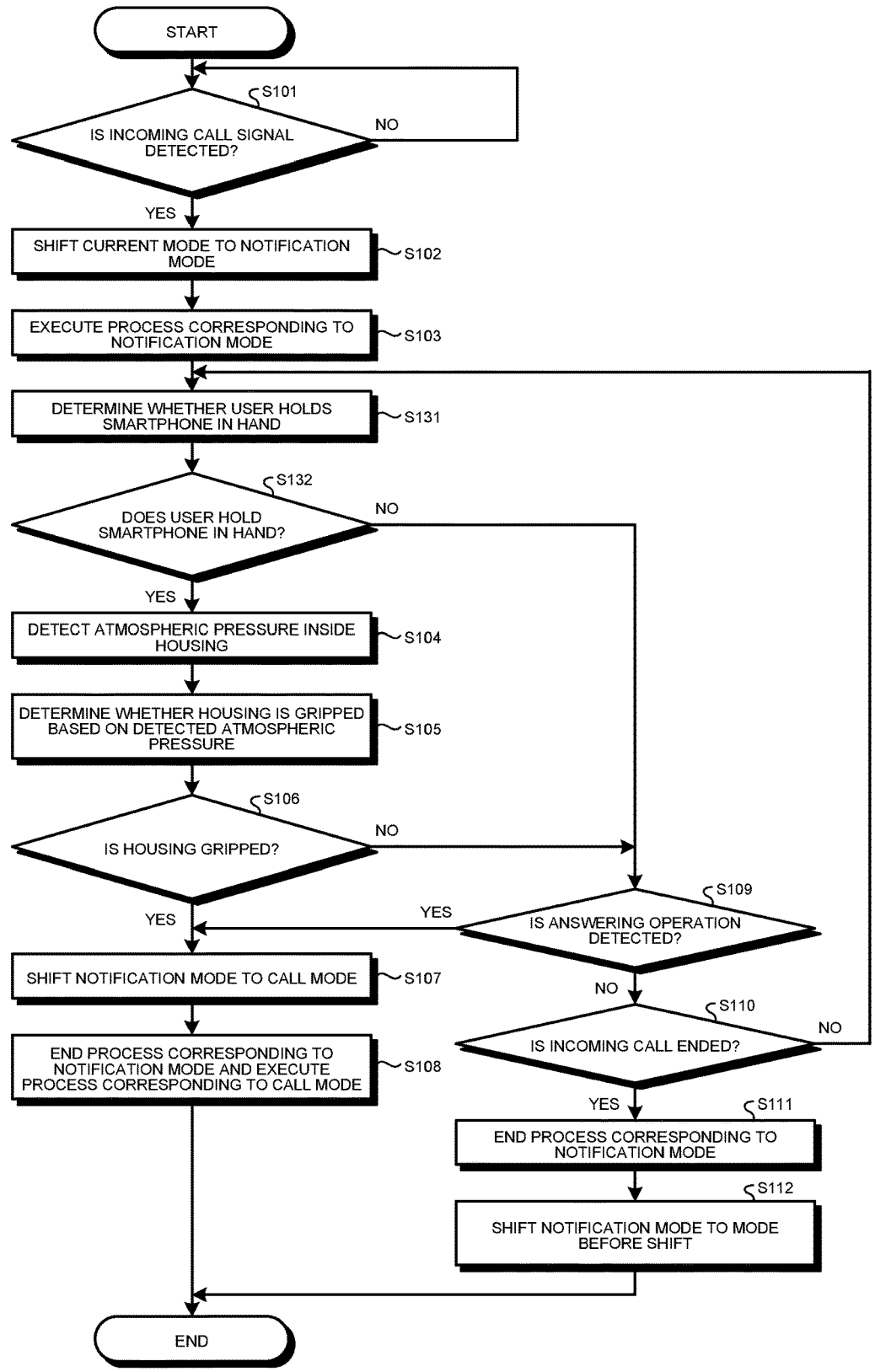
FIG. 10 is a flowchart illustrating an exemplary processing procedure of the control according to the smartphone.

FIG. 10 is a flowchart illustrating an exemplary processing procedure of the control according to the smartphone 1. The processing procedure illustrated in FIG. 10 is realized when the controller 10 executes the control program 9A. The processing procedure illustrated in FIG. 10 is executed when the function of the grip operation with respect to the housing 20 is effective.

In the example illustrated in FIG. 10, processes from Steps S101 to S112 are the same as the processes from Steps S101 to S112 illustrated in FIG. 6, and thus, only different parts will be described, and the same parts will be omitted.

When the process corresponding to the notification mode is executed at Step S103, the controller 10 proceeds to Step S131 as illustrated in FIG. 10. The controller 10 determines whether the user holds the smartphone 1 in the hand H based on the detection result of the acceleration sensor 15 at Step S131.

When it is determined that the user holds the smartphone 1 in the hand H (Yes at Step S132), the controller 10 performs the processes of Step S104 and the subsequent steps which have been already described. When it is determined that the user does not hold the smartphone 1 in the hand H (No at Step S132), the controller 10 performs the processes of Step S109 and the subsequent steps which have been already described.

When the incoming call is not ended at Step S110 (No at Step S110), the controller 10 proceeds to Step S131 which has been already described. That is, the controller 10 waits until the user is notified of the incoming call and holds the smartphone 1 in the hand H when the user does not hold the smartphone 1 in the hand H while repeating the processes of Step S131 and the subsequent steps.

Although the description has been given regarding the case of determining whether the user holds the smartphone 1 in the hand H after the shift to the notification mode of the incoming call, the smartphone 1 is not limited thereto. For example, the smartphone 1 may be configured such that after detecting the incoming call, whether the user holds the smartphone 1 in the hand H or not is determined before performing the shift to the notification mode. The smartphone 1 may sequentially determine whether the user holds the smartphone 1 in the hand H and store results of the determination in the storage 9 or the like. The smartphone 1 may be configured to refer to the determination result at the time point when it is determined that the smartphone 1 is gripped from the determination results sequentially determined.

Figure 11:
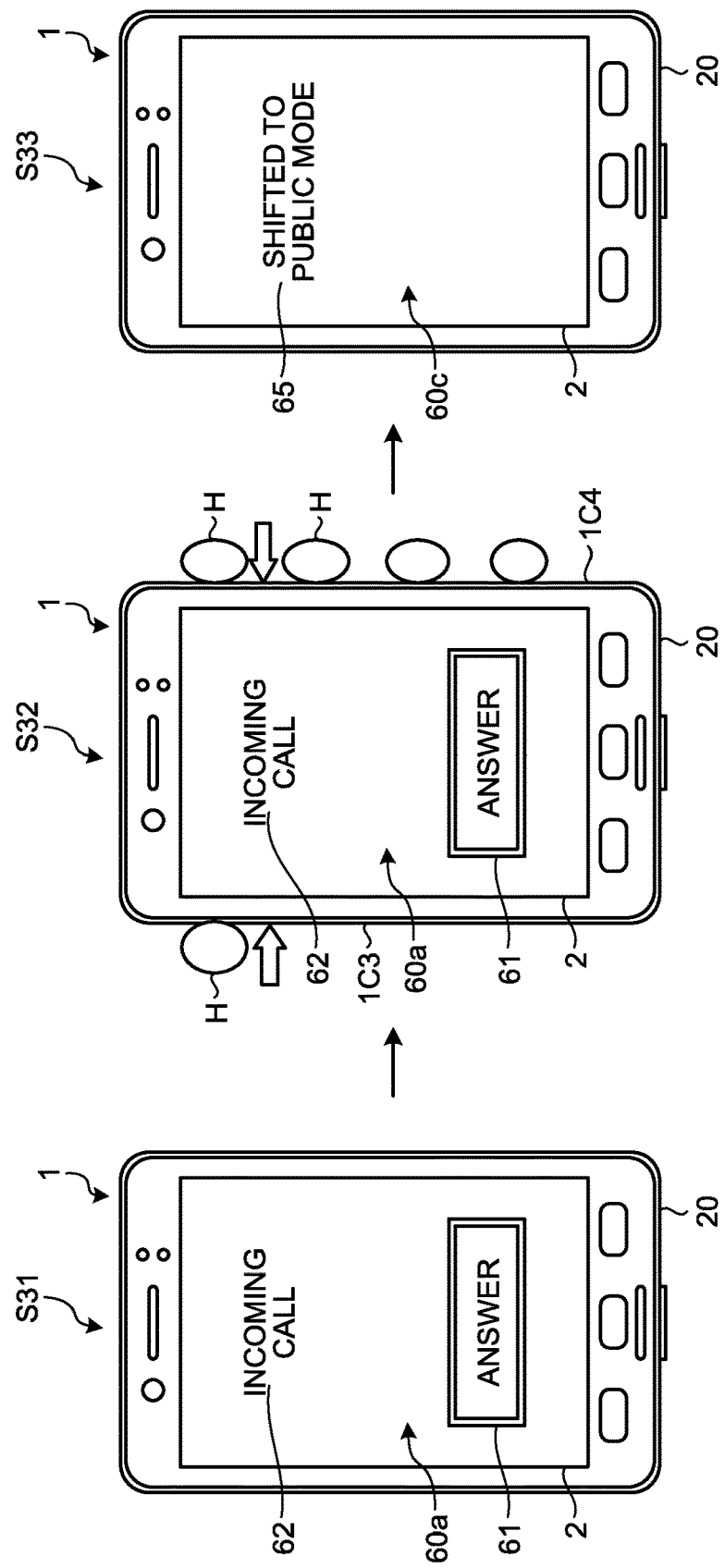
FIG. 11 is a diagram illustrating an example of control relating to acceptance of an incoming call according to the smartphone.

FIG. 11 is a diagram illustrating an example of control relating to acceptance of the incoming call according to the smartphone 1.

The smartphone 1 is shifted to the notification mode of notifying the incoming call from the electronic device at Step S31 when detecting the incoming call signal from the electronic device on the partner side using the communicator 6, and displays the above-described incoming call screen 60a on the touch screen display 2 (the display 2A). The smartphone 1 may notify the user of the incoming call using a ring tone, vibration, flashing of a lamp, and the like in addition to the display of the incoming call screen 60a. In such a case, the smartphone 1 can determine whether the user holds the smartphone 1 in the hand H or not based on the detection result of the acceleration sensor 15.

In Step S31, the user does not hold the smartphone 1. Further, the smartphone 1 can detect the atmospheric pressure inside the housing 20 using the atmospheric pressure sensor 19 when it is determined that the user does not hold the smartphone 1 in the hand H.

In Step S32, the user who has noticed the incoming call in the state of not holding the smartphone 1 strongly grips the housing 20 of the smartphone 1 in a stationary state in the hand H to cause the smartphone 1 to be shifted to the public mode. In the example illustrated in FIG. 11, the user grips the side faces 1C3 and 1C4 of the housing 20. Thereafter, the user takes away the hand H from the smartphone 1. As a result of strongly gripping the housing 20, the atmospheric pressure inside the housing 20 of the smartphone 1 increases. Further, the smartphone 1 can determine that the housing 20 is gripped by the user when detecting the increase of the atmospheric pressure inside the housing 20 using the atmospheric pressure sensor 19 in the notification mode and in the state where the user has not held the smartphone 1.

When the smartphone 1 determines that the housing 20 is gripped by the user in the stationary state, the notification mode is shifted to the public mode at Step S33. Further, the smartphone 1 can display a notification screen 60c, which indicates the shift to the public mode, on the touch screen display 2 (the display 2A) when the notification mode is shifted to the public mode. In the example illustrated in FIG. 11, the notification screen 60c includes a display area 65. A message, which indicates the shift to the public mode, is displayed in the display area 65. As a result, the user confirms that the smartphone 1 has been switched to the public mode. Further, the smartphone 1 can answer using the guidance or the like to inform the caller of the incapability of answering the call.

In this manner, the smartphone 1 can determine whether being gripped after determining the state where the user does not hold the smartphone 1 in the hand H in the notification mode. For example, when the user does not hold the smartphone 1 up regardless of being notified of the incoming call, there may be a high possibility that the user does not answer the call for some reasons. In this case, the user can cause the smartphone 1 to be shifted from the notification mode to the public mode by gripping the housing 20 without confirming display contents on the display 2A of the smartphone 1. Further, the user can operate the smartphone 1 by gripping the housing 20 in the bag, the pocket, or the like without taking the smartphone 1 out of the bag, the pocket, or the like.

Figure 12:
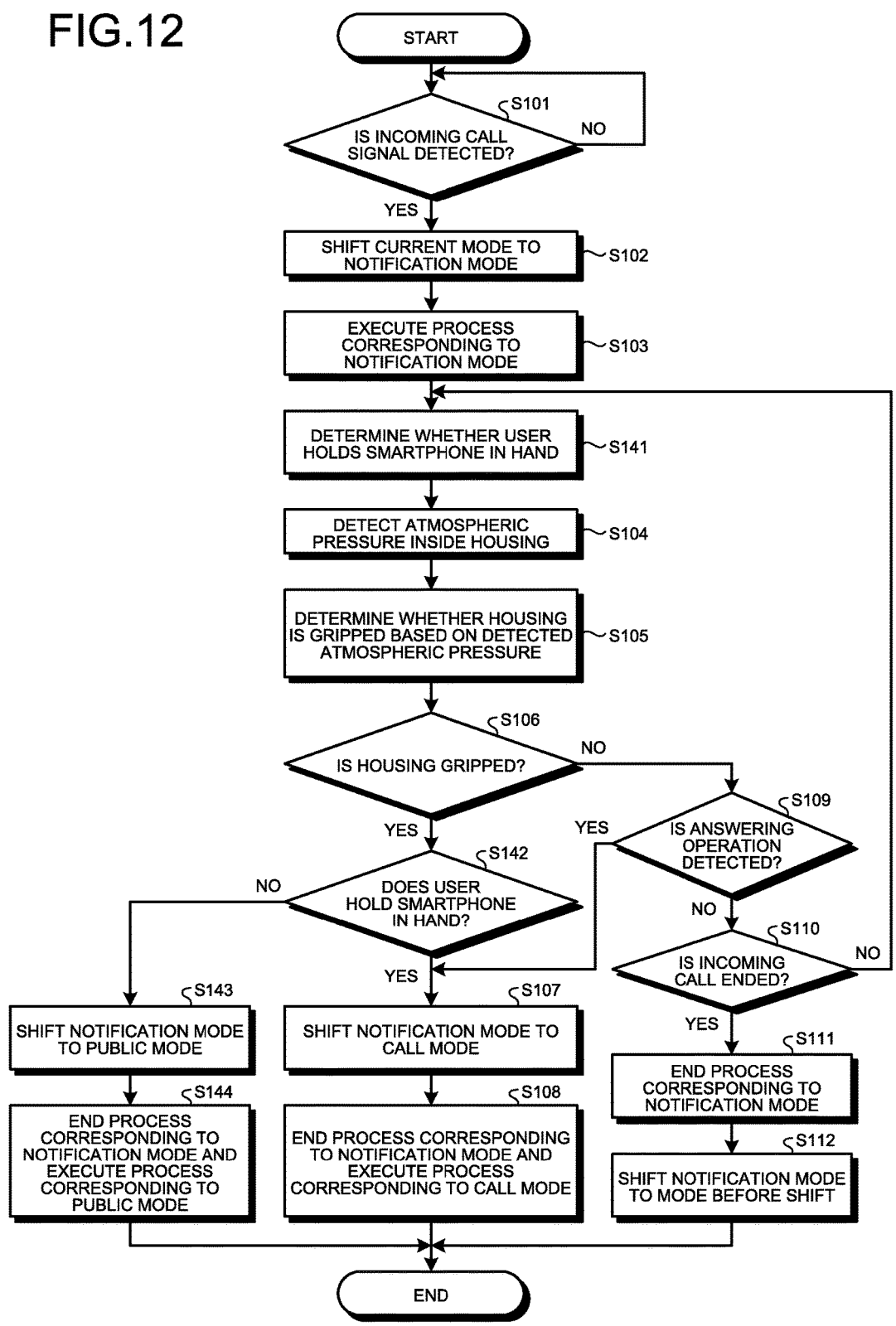
FIG. 12 is a flowchart illustrating an exemplary processing procedure of the control according to the smartphone.

FIG. 12 is a flowchart illustrating an exemplary processing procedure of the control according to the smartphone 1. The processing procedure illustrated in FIG. 12 is realized when the controller 10 executes the control program 9A. The processing procedure illustrated in FIG. 12 is executed when the function of the grip operation with respect to the housing 20 is effective.

In the example illustrated in FIG. 12, processes from Steps S101 to S112 are the same as the processes from Steps S101 to S112 illustrated in FIG. 6, and thus, only different parts will be described, and the same parts will be omitted.

When the process corresponding to the notification mode is executed at Step S103, the controller 10 proceeds to Step S141 as illustrated in FIG. 12. The controller 10 determines whether the user holds the smartphone 1 in the hand H based on the detection result of the acceleration sensor 15 and stores a result of the determination in the storage 9 or the like at Step S141. Further, the controller 10 executes the processes from Steps S104 to S106 which have been already described.

When the housing 20 is not gripped (No at Step S106), the controller 10 performs the processes of Step S109 and the subsequent steps which have been already described. When the incoming call is not ended (No at Step S110), the controller 10 proceeds to Step S141 which has been already described.

When the housing 20 is gripped (Yes at Step S106), the controller 10 proceeds to Step S142. Further, when it is determined that the user holds the smartphone 1 at Step S141 (Yes at Step S142), the controller 10 executes the processes of Steps S107 and S108 which have been already described. Thereafter, the controller 10 ends the processing procedure illustrated in FIG. 12.

When it is determined that the user does not hold the smartphone 1 at Step S141 (No at Step S142), the controller 10 proceeds to Step S143. The controller 10 shifts the notification mode to the public mode at Step S143. More specifically, the controller 10 stores information indicating the public mode a in the mode data 9Y, and displays the notification screen 60c, which indicates the shift to the public mode, on the touch screen display 2 (the display 2A).

The controller 10 ends the process corresponding to the notification mode and executes a process corresponding to the public mode at Step S144. More specifically, the controller 10 executes the control to answer using the guidance or the like to inform the caller of the incapability of answering the call using the communicator 6. Thereafter, the controller 10 ends the processing procedure illustrated in FIG. 12.

Embodiments disclosed in the present application can be modified within a scope not departing the gist and the scope of the application. Further, embodiments disclosed in the present application can be appropriately combined with each other. For example, the above-described embodiments may be modified as follows.

For example, each program illustrated in FIG. 4 may be divided into a plurality of modules or may be combined with other programs.

In the above-described embodiments, the smartphone 1 may be configured such that the detection of the atmospheric pressure inside the housing 20 is continued by the atmospheric pressure sensor 19 in the call mode, and the call mode is shifted to a mode of ending the call when the grip of the housing 20 is detected. As a result, the user can operate the start and end of the call only with the grip operation of the housing 20, and thus, it is possible to improve the operability.

Although the description has been given in the above-described embodiments regarding the case where the notification mode is shifted to the call mode when the grip of the housing 20 is detected in the notification mode where the incoming call is notified, the smartphone 1 is not limited thereto. For example, the smartphone 1 may be configured such that the notification mode is shifted to the call mode when the answering operation is detected using the touch screen display 2 in the notification mode, and further, the call mode is shifted to the public mode when the grip of the housing 20 is detected. For example, the smartphone 1 may be configured such that, when the grip of the housing 20 is detected in the notification mode where reception of an e-mail is notified, the notification mode is shifted to a browsing mode where the received mail that has been notified is displayed.

Although the description has been given in the above-described embodiments regarding the smartphone as an example of the mobile electronic device provided with the atmospheric pressure sensor, the mobile electronic device according to the appended claims is not limited to the smartphone. The mobile electronic device according to the appended claims may be a mobile electronic device other than the smartphone. Examples of the mobile electronic device include, but are not limited to a mobile phone, a tablet, a portable personal computer, a digital camera, a media player, an e-book reader, a navigator, a game console, etc.

Characteristic embodiments have been described in order to completely and definitely disclose any techniques according to the appended claims. However, the appended claims are not to be thus limited by the above-described embodiments, but are to be construed as embodying all modifications and alternative constructions that may occur to those skilled in the art which fairly fall within the basic teaching herein set forth.

The invention claimed is:

1. A mobile electronic device comprising:
a housing;
an atmospheric pressure sensor configured to detect atmospheric pressure inside the housing;
an acceleration sensor; and
at least one controller configured to shift a current notification mode of notifying acceptance of an incoming call to a public mode of answering to inform a caller of incapability of accepting the incoming call when it is determined that the housing is not in a state of being held in a user's hand based on a detection result of the acceleration sensor, and the housing has been gripped by the user of the mobile electronic device from a state not being held in the user's hand based on the atmospheric pressure inside the housing detected by the atmospheric pressure sensor.

2. The mobile electronic device according to claim 1, wherein
the at least one controller is further configured to shift the current notification mode to a call mode of allowing a call with an electronic device on a partner side when it is determined that the housing is in the state of being held in the user's hand based on the detection result of the acceleration sensor, and the housing has been gripped by the user from a state being held in the user's hand based on the atmospheric pressure inside the housing detected by the atmospheric pressure sensor.

3. A control method of a mobile electronic device with a housing, an acceleration sensor, and an atmospheric pressure sensor, the control method comprising:
detecting atmospheric pressure inside the housing using the atmospheric pressure sensor; and
shifting a current notification mode of notifying acceptance of an incoming call to a public mode of answering to inform a caller of incapability of accepting the incoming call when it is determined that the housing is not in a state of being held in a user's hand based on a detection result of the acceleration sensor, and the housing has been gripped by the user of the mobile electronic device from a state not being held in the user's hand based on the atmospheric pressure inside the housing detected by the atmospheric pressure sensor.

4. A non-transitory storage medium that stores a control program for causing a mobile electronic device with a housing, an acceleration sensor, and an atmospheric pressure sensor to execute:
detecting atmospheric pressure inside the housing using the atmospheric pressure sensor; and
shifting a current notification mode of notifying acceptance of an incoming call to a public mode of answering to inform a caller of incapability of accepting the incoming call when it is determined that the housing is not in a state of being held in a user's hand based on a detection result of the acceleration sensor, and the housing has been gripped by the user of the mobile electronic device from a state not being held in the user's hand based on the atmospheric pressure inside the housing detected by the atmospheric pressure sensor.

* * * * *